United States Patent
Soda et al.

(10) Patent No.: US 10,083,546 B2
(45) Date of Patent: Sep. 25, 2018

(54) AUGMENTED REALITY INFORMATION DISPLAYING DEVICE AND AUGMENTED REALITY INFORMATION DISPLAYING METHOD

(71) Applicant: FUJITSU TEN LIMITED, Kobe-shi, Hyogo (JP)

(72) Inventors: Tomofumi Soda, Kobe (JP); Masahiro Iino, Kobe (JP); Chiharu Yamamoto, Kobe (JP); Satoru Ikeda, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 2 days.

(21) Appl. No.: 15/460,747

(22) Filed: Mar. 16, 2017

(65) Prior Publication Data
US 2017/0294046 A1    Oct. 12, 2017

(30) Foreign Application Priority Data

Apr. 11, 2016 (JP) ................. 2016-079055

(51) Int. Cl.
*G06T 5/00* (2006.01)
*G06T 3/20* (2006.01)
(Continued)

(52) U.S. Cl.
CPC .............. *G06T 19/006* (2013.01); *B60R 1/00* (2013.01); *G06F 3/011* (2013.01); *G06T 7/20* (2013.01);
(Continued)

(58) Field of Classification Search
CPC .................................... G06T 19/006
See application file for complete search history.

(56) References Cited

U.S. PATENT DOCUMENTS

2010/0070175 A1* 3/2010 Soulchin ................. G06T 17/05
701/414
2012/0206452 A1* 8/2012 Geisner ................ G02B 27/017
345/419
(Continued)

FOREIGN PATENT DOCUMENTS

| JP | 2008-009654 A | 1/2008 |
| JP | 2012-068481 A | 4/2012 |
| JP | 2013-149029 A | 8/2013 |
| JP | 2015-120395 A | 7/2015 |
| WO | 2012/033095 A1 | 3/2012 |

*Primary Examiner* — Phi Hoang
(74) *Attorney, Agent, or Firm* — Oliff PLC

(57) ABSTRACT

An augmented reality information displaying device according to the embodiment includes a storage, a display-position deciding unit, and a display controller. The storage stores augmented reality information associated with a real position. The display-position deciding unit decides a display position of the augmented reality information on a display screen of a transmission-type display device based on a real position of a user that visually recognizes the display screen, a real position of the display screen, the real position in the scene through the display screen associated with the augmented reality information. The display controller controls to display, at a display position decided by the display-position deciding unit, the augmented reality information corresponding to a mode according to positional relationship between the real position of the user and the real position associated with the augmented reality information in the scene.

9 Claims, 10 Drawing Sheets

(51) Int. Cl.
    *G06T 3/40*         (2006.01)
    *G06T 19/00*       (2011.01)
    *G06T 7/20*         (2017.01)
    *G06F 3/01*         (2006.01)
    *B60R 1/00*         (2006.01)
    *G01S 19/13*       (2010.01)

(52) U.S. Cl.
    CPC ................ *B60K 2350/2013* (2013.01); *B60K 2350/2095* (2013.01); *B60K 2350/352* (2013.01); *B60K 2350/921* (2013.01); *B60R 2300/105* (2013.01); *B60R 2300/107* (2013.01); *B60R 2300/20* (2013.01); *B60R 2300/308* (2013.01); *G01S 19/13* (2013.01)

(56) References Cited

U.S. PATENT DOCUMENTS

| | | | |
|---|---|---|---|
| 2014/0292645 A1* | 10/2014 | Tsurumi | G06F 3/011 345/156 |
| 2015/0091780 A1* | 4/2015 | Lyren | G02B 27/017 345/8 |
| 2015/0188984 A1* | 7/2015 | Mullins | H04L 67/04 709/219 |
| 2016/0179830 A1* | 6/2016 | Schmalstieg | G06F 17/30333 707/722 |
| 2017/0038593 A1* | 2/2017 | Travers | G02B 27/01 |
| 2017/0147713 A1* | 5/2017 | Reeves | G06F 17/50 |
| 2017/0169612 A1* | 6/2017 | Cashen | G06T 19/006 |
| 2017/0200310 A1* | 7/2017 | Kapinos | G06T 19/003 |

* cited by examiner

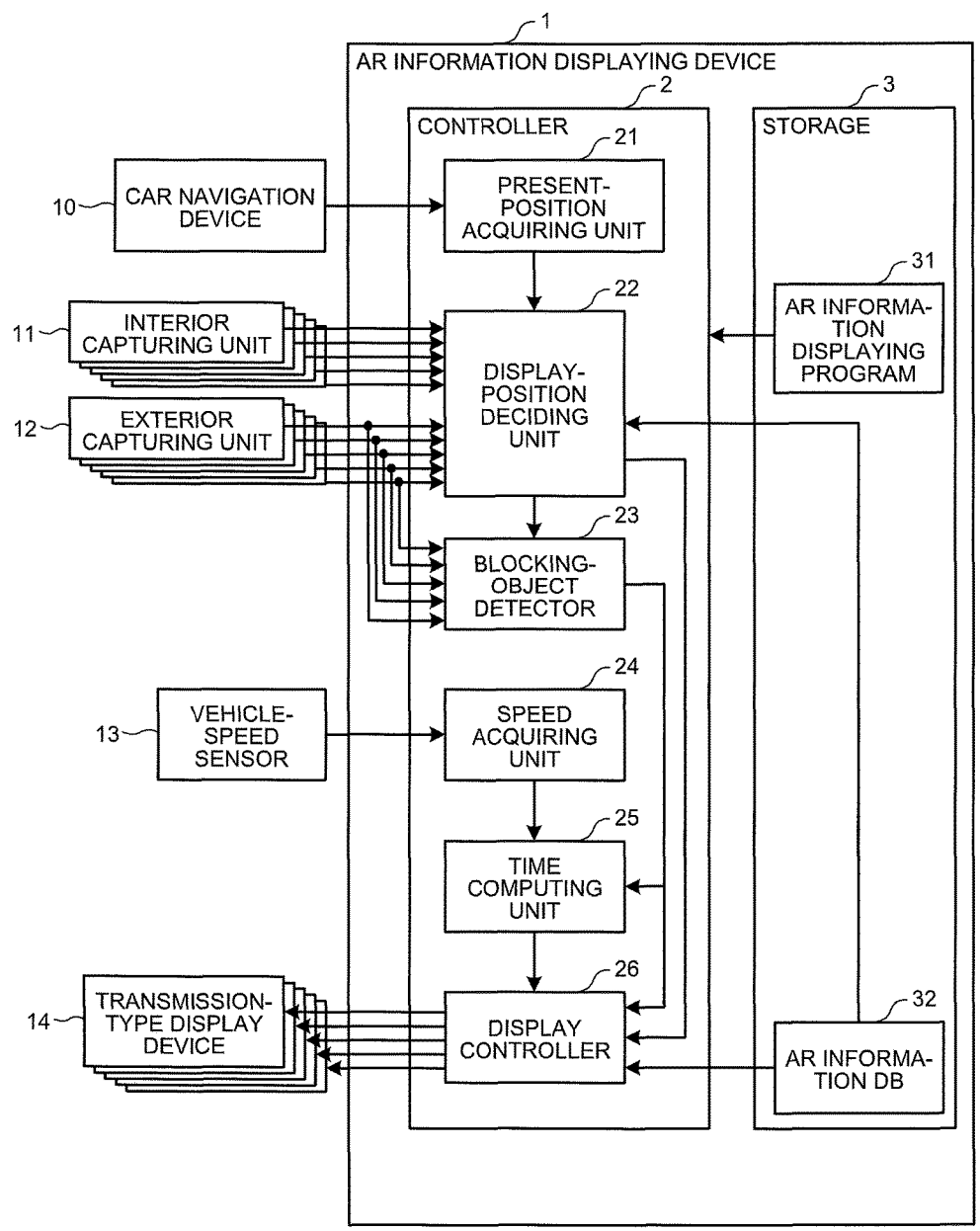

FIG.3

| AR ASSOCIATED POSITION | AR INFORMATION | | |
|---|---|---|---|
| | PAST | PRESENT | FUTURE |
| NORTHERN LATITUDE OF X DEGREES EASTERN LONGITUDE OF Y DEGREES | THREE-DIMENSIONAL IMAGE INFORMATION TEXT INFORMATION | TEXT INFORMATION | THREE-DIMENSIONAL IMAGE INFORMATION TEXT INFORMATION |
| ⋮ | ⋮ | ⋮ | ⋮ |

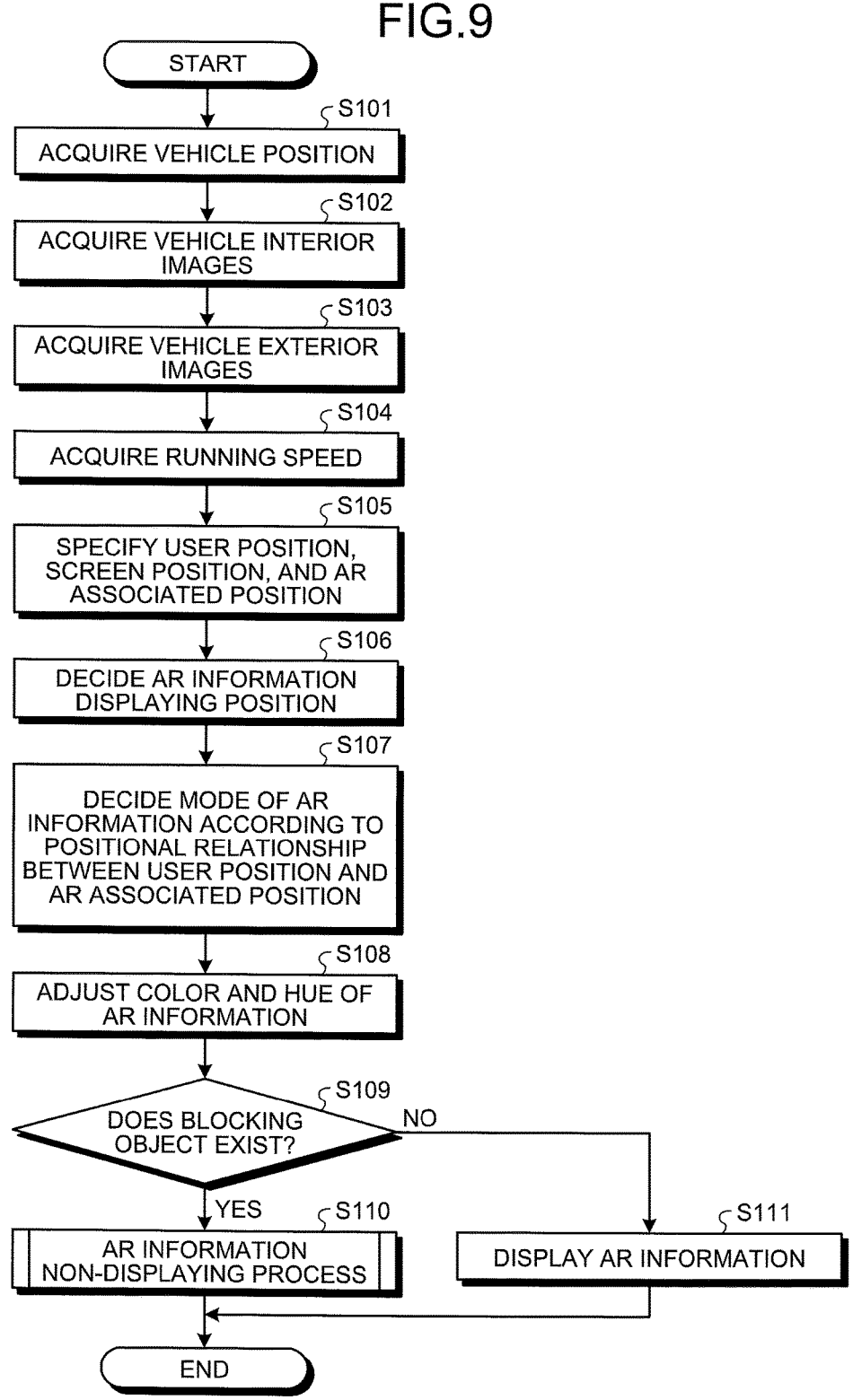

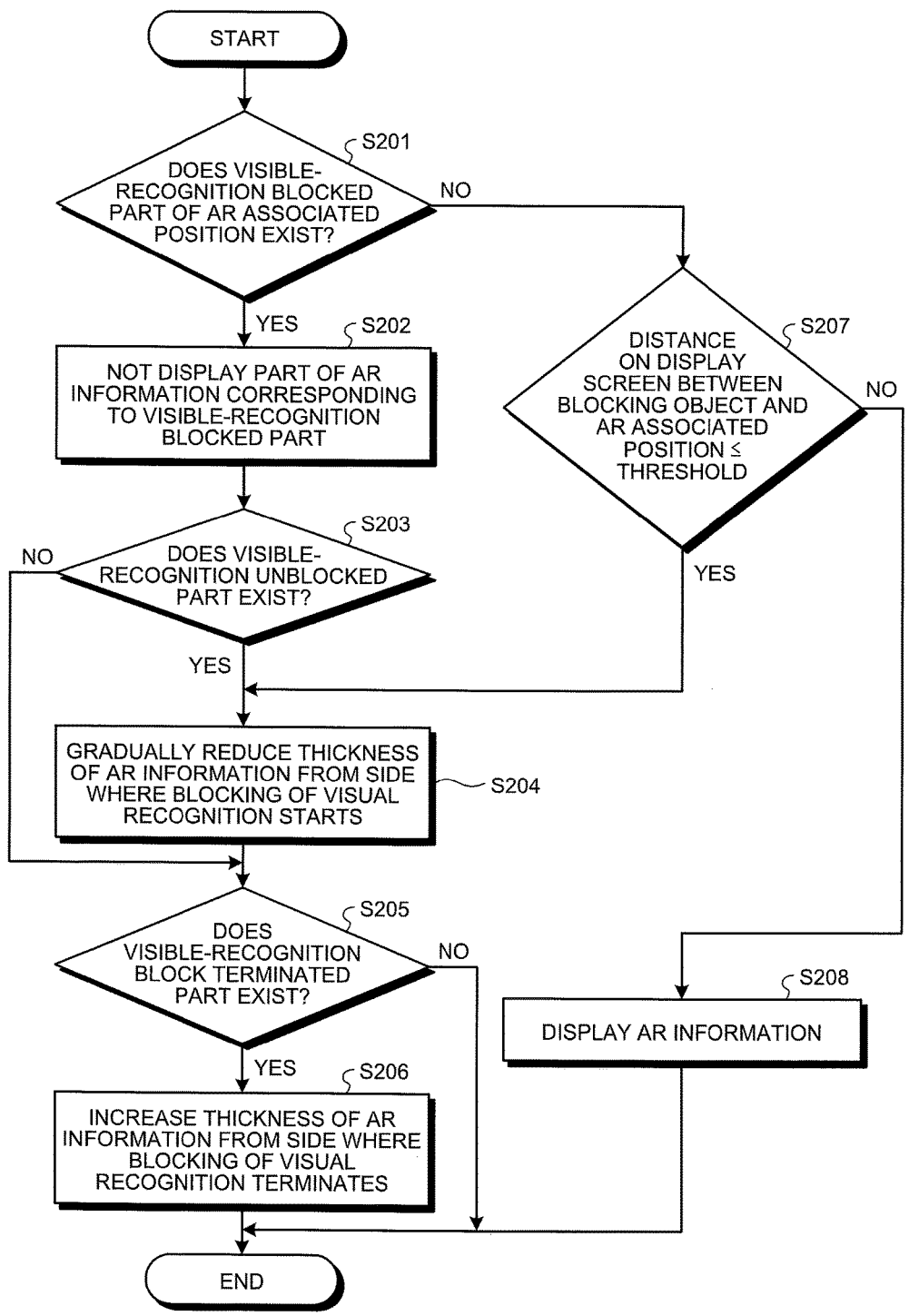

AUGMENTED REALITY INFORMATION DISPLAYING DEVICE AND AUGMENTED REALITY INFORMATION DISPLAYING METHOD

CROSS-REFERENCE TO RELATED APPLICATION

This application is based upon and claims the benefit of priority of the prior Japanese Patent Application No. 2016-079055, filed on Apr. 11, 2016 the entire contents of which are incorporated herein by reference.

FIELD

The embodiment discussed herein is directed to an augmented reality information displaying device and an augmented reality information displaying method.

BACKGROUND

Conventionally, there is known a device that superimposes, on a display screen of a transmission-type display device, augmented reality information on a real position in a scene seen through the display screen to display this information (for example, Japanese Laid-open Patent Publication No. 2012-068481).

However, the conventional device displays the same augmented reality information with respect to the real position in the scene seen through the display screen, and thus it is difficult to improve a sense of immersion of a user in the augmented reality information.

SUMMARY

It is an object of the present invention to at least partially solve the problems in the conventional technology. An augmented reality information displaying device according to the embodiment includes a storage, a display-position deciding unit, and a display controller. The storage stores augmented reality information associated with a real position. The display-position deciding unit decides a display position of the augmented reality information on a display screen of a transmission-type display device based on a real position of a user that visually recognizes the display screen, a real position of the display screen, the real position in the scene through the display screen associated with the augmented reality information. The display controller controls to display, at a display position decided by the display-position deciding unit, the augmented reality information corresponding to a mode according to positional relationship between the real position of the user and the real position associated with the augmented reality information in the scene. The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a functional block diagram illustrating a configuration of an AR information displaying device according to the embodiment;

FIG. 3 is a diagram illustrating an AR information database according to the embodiment;

FIG. 9 is a flowchart illustrating a process executed by a controller according to the embodiment; and FIG. 10 is a flowchart illustrating a process executed by the controller according to the embodiment.

DESCRIPTION OF EMBODIMENTS

Hereinafter, an embodiment of an augmented reality information displaying device and an augmented reality information displaying method will be described in detail with reference to the accompanying drawings. The disclosed technology is not limited to the embodiment described below.

In the present embodiment, an Augmented Reality information (hereinafter, may be referred to as "AR information") displaying device that causes a transmission-type display device, which is laminated to a window glass of a vehicle, to display AR information will be explained as an example. The AR information displaying device according to the embodiment may also cause a transmission-type display device, which is laminated to a window glass of a ship, an airplane, a glass-covered elevator, etc. to display the AR information.

The AR information displaying device according to the embodiment may also cause a transmission-type display device to display the AR information, which laminated to a window glass of a body-sensitive amusement facility that causes a passenger, which visually recognizes the scene seen through the glass, to realistically feel various attractions.

Figure 1A:
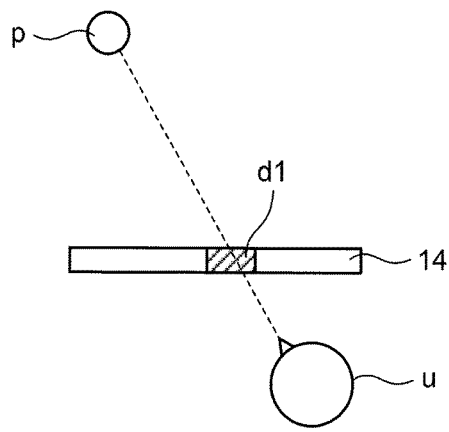
FIGS. 1A to 1C are diagrams illustrating an Augmented Reality information (AR information) displaying method according to an embodiment.
Figure 1B:
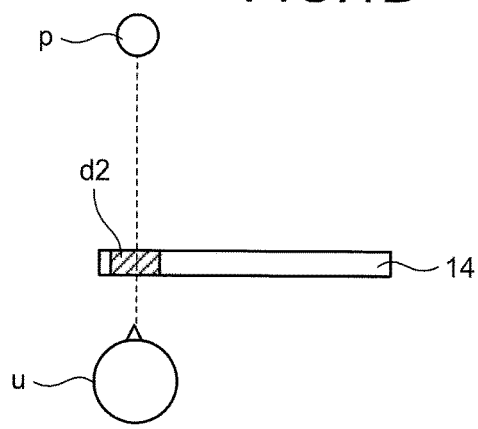
Figure 1C:
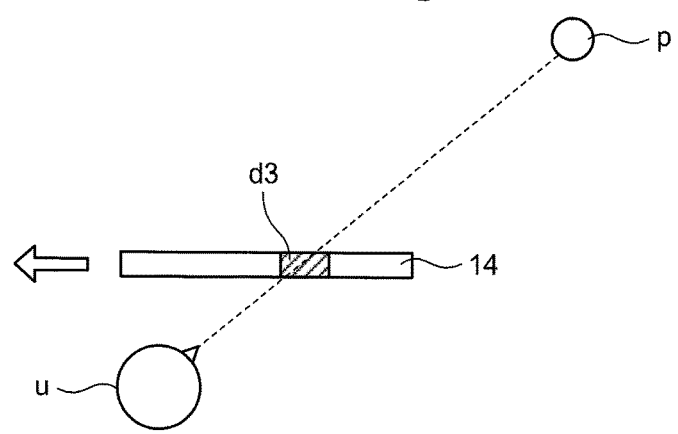

FIGS. 1A to 1C are diagrams illustrating an AR information displaying method according to the embodiment. In FIGS. 1A to 1C, positional relationships in planar view are indicated between a transmission-type display device 14 laminated to a window glass of a vehicle, a user u that visually recognizes in the vehicle a display screen (hereinafter, may be simply referred to as "display screen") of the transmission-type display device 14, and a real position p outside of the vehicle associated with the AR information.

In the situation illustrated in FIG. 1A, the user u gets on at a right rear side seat of the vehicle, and looks at, through the transmission-type display device 14, the real position p positioned right forward of the vehicle from comparative backward of a right rear window glass.

In this case, the AR information displaying device decides a display position of the AR information on the display screen on the basis of the real position of the user u, the real position of the display screen, and the real position p associated with the AR information in the scene seen from the user u through the display screen. Hereinafter, the real position of the user u may be referred to as "user position", the real position of the display screen may be referred to as "screen position", and the real position p associated with the AR information may be referred to as "AR associated position p".

In the situation illustrated in FIG. 1A, the AR information displaying device decides, as a canter point of a display position of AR information d1 associated with the AR associated position p in the scene, an intersection point between the display screen and a straight line (dotted line illustrated in FIG. 1A) connecting the user position and the AR associated position p in the scene.

The AR information displaying device causes, for example, the transmission-type display device to display the AR information d1 at the decided display position on the display screen. In this case, the AR information displaying device causes, for example, the transmission-type display device to display the AR information d1 corresponding to a mode according to the positional relationship between the user position and the AR associated position p in the scene.

Subsequently, for example, as illustrated in FIG. 1B, the user u moves in some cases to a comparative forward side of the right rear window glass, and looks at the AR associated position p in the scene. In this case, the AR information displaying device decides, as a canter point of a display position of AR information d2 associated with the AR associated position p in the scene, an intersection point between the display screen and a straight line (dotted line illustrated in FIG. 1B) connecting the user position and the AR associated position p in the scene in the situation illustrated in FIG. 1B.

The AR information displaying device causes, for example, the transmission-type display device to display the AR information d2 at the decided display position on the display screen. Herein, the AR information displaying device causes the AR information d2 of a mode, which is different from that of the AR information d1 displayed earlier, according to the positional relationship between the user position and the AR associated position p in the scene in the situation illustrated in FIG. 1B to be displayed.

Subsequently, for example, as illustrated in FIG. 1C, when the vehicle moves forward, the AR associated position p in the scene relatively moves to the right back of the vehicle. In this case, the AR information displaying device decides, as a canter point of a display position of AR information d3 on the AR associated position p in the scene, an intersection point between the display screen and a straight line (dotted line illustrated in FIG. 1C) connecting the user position and the AR associated position p in the scene in the situation illustrated in FIG. 1C.

The AR information displaying device causes, for example, the transmission-type display device to display the AR information d3 at the decided display position on the display screen. Herein, the AR information displaying device causes, for example, the transmission-type display device to display the AR information d3 of a mode, which is different from that of the AR information d2 displayed earlier, according to the positional relationship between the user position and the AR associated position p in the scene in the situation illustrated in FIG. 1C. Specific mode examples of the AR information controlled to be displayed by the AR information displaying device according to the embodiment will be mentioned later with reference to FIGS. 4A to 8B.

Thus, the AR information displaying device according to the embodiment decides the display positions on the display screen of the pieces of AR information d1, d2, and d3 on the AR associated position p in the scene on the basis of the user positions, the screen positions, and the AR associated position p in the scene seen through the display screen.

Thus, the AR information displaying device according to the embodiment can decide, as the display positions of the pieces of AR information d1, d2, and d3 on the AR associated position p in the scene, respective positions on the display screen overlapped with the AR associated position p in the scene seen from the user u.

The AR information displaying device according to the embodiment causes, for example, the transmission-type display device to display, at the decided display positions, the respective pieces of AR information d1, d2, and d3 of modes according to the positional relationship between the user positions and the AR associated position p in the scene.

Therefore, the AR information displaying device can cause, for example, the transmission-type display device to display the pieces of AR information d1, d2, and d3 of the mode as if the pieces of AR information d1, d2, and d3 existed at the real AR associated position p seen through the display screen, and thus a sense of immersion of the user for the pieces of AR information d1, d2, and d3 can be improved.

Next, a configuration of an AR information displaying device 1 according to the embodiment will be explained with reference to FIG. 2. FIG. 2 is a functional block diagram illustrating the configuration of the AR information displaying device 1 according to the embodiment. The AR information displaying device 1 is a device that is mounted on a vehicle, and controls to display the AR information on a front window and window glasses of the vehicle.

As illustrated in FIG. 2, the AR information displaying device 1 is connected with a car navigation device 10, five interior capturing units 11, five exterior capturing units 12, a vehicle-speed sensor 13, and five transmission-type display devices 14.

The car navigation device 10 is a device that stores map information and executes route guidance from the present position of the vehicle to an input destination by using the map information and a Global Positioning System (GPS). The car navigation device 10 outputs information indicating the real position during running of the vehicle to the AR information displaying device 1.

Each of the interior capturing units 11 is a camera that includes a capturing element such as a Charge Coupled Device (CCD) and a Complementary Metal Oxide Semiconductor (CMOS). The interior capturing units 11 are respectively arranged at a position from which capturing of a user at a front seat of the vehicle from a front-window side is executed, a position from which capturing of a user at a front right seat of the vehicle from a front right window-glass side of the vehicle is executed, and a position from which capturing of a user at a front left seat of the vehicle from a front left window-glass side of the vehicle is executed.

Moreover, the interior capturing units 11 are respectively arranged at a position from which capturing of a user at a back right seat of the vehicle from a back right window-glass side of the vehicle is executed and a position from which capturing of a user at a back left seat of the vehicle from a rear left window-glass side of the vehicle is executed. Each of the interior capturing units 11 outputs captured vehicle-interior images to the AR information displaying device 1.

Each of the exterior capturing units 12 is a camera that includes a capturing element such as a Charge Coupled Device (CCD) and a Complementary Metal Oxide Semiconductor (CMOS). The exterior capturing units 12 are respectively arranged at a position from which the vehicle-exterior scene seen through the front window is captured, a position from which the vehicle-exterior scene seen through the front right window glass of the vehicle is captured, and a position from which the vehicle-exterior scene seen through the front left window glass of the vehicle is captured.

Moreover, the exterior capturing units 12 are respectively arranged at a position from which the vehicle-exterior scene seen through the back right window glass of the vehicle is captured and a position from which the vehicle-exterior scene seen through the rear left window glass of the vehicle is captured. Each of the exterior capturing units 12 outputs the captured vehicle-exterior images to the AR information displaying device 1. The vehicle-speed sensor 13 is a sensor that detects the running speed of the own vehicle on which the AR information displaying device 1 is mounted, and outputs the detected result of the running speed to the AR information displaying device 1.

Each of the transmission-type display devices 14 is a display such as a transparent liquid crystal display and a transparent organic ElectroLuminescence display (transparent organic EL display), whose display screen has the optical transparency. The transmission-type display devices 14 are laminated to whole surfaces of the front window, the front right window glass in the vehicle, the front left window glass in the vehicle, the back right window glass in the vehicle, and the back left window glass in the vehicle, respectively. The transmission-type display devices 14 display the AR information input from the AR information displaying device 1.

The AR information displaying device 1 includes a controller 2 and a storage 3. The storage 3 stores information on an AR information displaying program 31, an AR information DataBase (DB) 32, etc. This storage 3 is, for example, a semiconductor memory element such as a Random Access Memory (RAM) and a flash memory; or a storage device such as a Hard Disk Drive (HDD) and an optical disk.

Herein, the AR information DB 32 according to the embodiment will be explained with reference to FIG. 3. FIG. 3 is a diagram illustrating the AR information DB 32 according to the embodiment. As illustrated in FIG. 3, the AR information DB 32 includes a plurality of AR associated positions and pieces of the AR information on the respective AR associated positions.

The AR associated positions are position information indicated by, for example, the latitude and the longitude. The AR information is, for example, three-dimensional image information, text information, and the like, which are associated with the AR associated positions. In the present embodiment, for each of the AR associated positions, the past three-dimensional image information and the past text information on the corresponding AR associated position, the present text information on the corresponding AR associated position, and the future three-dimensional image information and the future text information on the corresponding AR associated position are associated with one another.

The past three-dimensional image information is, for example, information on three-dimensional Computer Graphics (CG) obtained by reproducing buildings and the scene existed in past times at the corresponding AR associated positions. The past text information is text information including information on buildings and estates existed in past times at the corresponding AR associated positions. The present text information is text information including information on buildings and estates presently exist at the corresponding AR associated positions.

The future three-dimensional image information is information on the three-dimensional CG obtained by reproducing buildings to be built in the future at the corresponding AR associated positions. The future text information is text information including information on buildings and estates to be built in the future at the corresponding AR associated positions. The AR information DB 32 illustrated in FIG. 3 is merely one example, and thus any AR information other than the AR information illustrated in FIG. 3 may be sufficient as long as the information is displayed on the display screens of the transmission-type display devices 14.

By returning to FIG. 2, the controller 2 includes, for example, various circuits and a microcomputer including a Central Processing Unit (CPU), a Read Only Memory (ROM), a Random Access Memory (RAM), an input/output port, etc.

The controller 2 includes a present-position acquiring unit 21, a display-position deciding unit 22, a blocking-object detector 23, a speed acquiring unit 24, a time computing unit 25, and a display controller 26. For example, the aforementioned CPU reads out and executes the AR information displaying program 31 stored in the storage 3 to realize functions of each of the present-position acquiring unit 21, the display-position deciding unit 22, the blocking-object detector 23, the speed acquiring unit 24, the time computing unit 25, and the display controller 26.

A part or whole of each of the present-position acquiring unit 21, the display-position deciding unit 22, the blocking-object detector 23, the speed acquiring unit 24, the time computing unit 25, and the display controller 26 may be constituted of the hardware such as an Application Specific Integrated Circuit (ASIC) and a Field Programmable Gate Array (FPGA). Hereinafter, the present-position acquiring unit 21, the display-position deciding unit 22, the blocking-object detector 23, the speed acquiring unit 24, the time computing unit 25, and the display controller 26 will be specifically explained.

The present-position acquiring unit 21 acquires, from the car navigation device 10, information (hereinafter, may be referred to as "vehicle position") indicating the present real position of the own vehicle on which the AR information displaying device 1 is mounted. The vehicle position is information indicating, for example, the latitude and the longitude of the position where the own vehicle runs. The present-position acquiring unit 21 outputs the vehicle position acquired from the car navigation device 10 to the display-position deciding unit 22.

The display-position deciding unit 22 is a processing unit that decides the display position of the AR information on the display screen on the basis of vehicle interior images input from the interior capturing units 11, vehicle exterior images input from the exterior capturing units 12, and the AR information DB 32 stored in the storage 3.

This display-position deciding unit 22 specifies the real positions of the respective users that visually recognize the display screens of the transmission-type display devices 14 by using vehicle interior images input from the interior capturing units 11. For example, the display-position deciding unit 22 extracts a face of the user from vehicle interior images to specify the user position on the basis of the position and the direction of the face of the user in the vehicle and the vehicle position input from the present-position acquiring unit 21. A procedure for specifying the user positions is not limited thereto, and any procedure may be applied as long as the procedure can specify the user positions.

The display-position deciding unit 22 specifies the screen positions on the basis of, for example, the vehicle position input from the present-position acquiring unit 21 and respective already-known positions of the display screens of the transmission-type display devices 14 in the own vehicle. A procedure for specifying the screen positions is not limited thereto, and any procedure may be applied as long as the procedure can specify the screen positions.

The display-position deciding unit 22 specifies the AR associated positions in the scene through the respective display screens by using vehicle exterior images input from the exterior capturing units 12. For example, the display-position deciding unit 22 extracts a building and the like from vehicle exterior images of continuously captured two frames, and compute, by using the principle of stereoscopic camera, the distance from the exterior capturing units 12 to the building and the like on the basis of the differential between the two frames of the building and the like in the vehicle exterior images.

Subsequently, the display-position deciding unit 22 specifies the real position of the building and the like on the basis of the distance from each of the exterior capturing units 12 to the building and the like and the vehicle position acquired from the car navigation device 10. The display-position deciding unit 22 determines whether or not the AR information on the real position of the building and the like exists in the AR information DB 32, and, when existing, specifies the real position of the building and the like as the AR associated position.

The display-position deciding unit 22 may employ a configuration by which the AR associated position is specified by using another procedure. For example, the display-position deciding unit 22 may compute ranges of the latitude and the longitude corresponding to a region of the scene included in the vehicle exterior image on the basis of the vehicle position and a capture range of each of the exterior capturing units 12. The display-position deciding unit 22 may retrieve the AR associated position existing in the computed ranges of the latitude and the longitude from the AR information DB 32 so as to specify the AR associated position.

The display-position deciding unit 22 decides the display position of the AR information on the display screen on the basis of the user position, the screen position, and the AR associated position, which are specified in such a manner, by using the procedure illustrated in FIGS. 1A to 1C. The display-position deciding unit 22 outputs, to the display controller 26, information indicating the specified AR associated position, the user position, and the decided display position of the AR information. The display-position deciding unit 22 outputs information indicating the specified AR associated position and the decided display position to the display controller 26 and the blocking-object detector 23.

The blocking-object detector 23 is a processing unit that detects a blocking object blocking visual recognition of the AR associated position from the display position of the AR information on the basis of vehicle exterior images input from each of the exterior capturing units 12, the AR associated position input from the display-position deciding unit 22, and the display position of the AR information.

The blocking-object detector 23 outputs information on the detected blocking object to the time computing unit 25 and the display controller 26. The information on the blocking object includes, for example, information indicating the real position of the blocking object and information indicating the size of the blocking object.

The speed acquiring unit 24 is a processing unit that acquires information indicating the running speed of the own vehicle from the vehicle-speed sensor 13 and outputs the information to the time computing unit 25. The time computing unit 25 is a processing unit that computes a duration time, during which visual recognition of the AR associated position from the display position of the AR information is blocked by the blocking object, on the basis of information indicating the running speed input from the speed acquiring unit 24 and information on the blocking object input from the blocking-object detector 23. The time computing unit 25 outputs the information indicating the computed duration time to the display controller 26.

The display controller 26 acquires information indicating the AR associated position specified by the display-position deciding unit 22, the user position, and the decided display position of the AR information. The display controller 26 acquires the information on the detected blocking object from the blocking-object detector 23, and further acquires information indicating the computed duration time from the time computing unit 25.

The display controller 26 reads the AR information to be displayed on the display screen from the AR information DB 32 on the basis of the information input from the display-position deciding unit 22, outputs the information to the transmission-type display devices 14, and causes, for example, the transmission-type display devices 14 to display the information at the display position decided by the display-position deciding unit 22.

In this case, the display controller 26 causes, for example, the transmission-type display devices 14 to display the AR information corresponding to a mode according to the positional relationship between the AR associated position and the user position on the basis of the information input from the display-position deciding unit 22, the blocking-object detector 23, and the time computing unit 25.

Next, specific mode examples of the AR information controlled to be displayed by the display controller 26 according to the embodiment will be explained with reference to FIG. 4A to FIG. 8B. FIGS. 4A to 8B are diagrams illustrating specific mode examples of the AR information controlled to be displayed by the display controller 26 according to the embodiment.

Figure 4A:
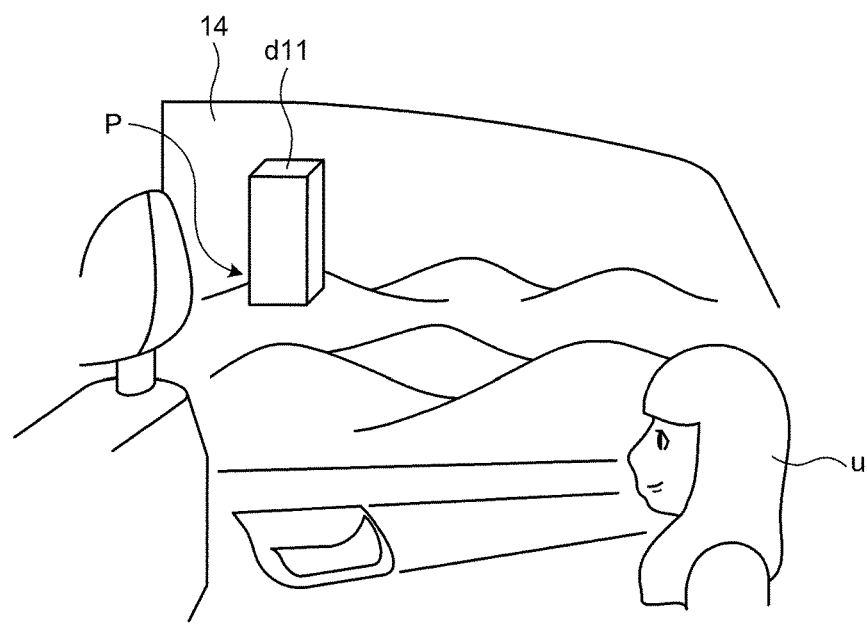
FIGS. 4A to 8B are diagrams illustrating specific mode examples of AR information controlled to be displayed by a display controller according to the embodiment.

As illustrated in FIG. 4A, for example, when a building is to be built in the future at the AR associated position p seen through the window glass of the vehicle, the AR information on the AR associated position p is displayed at the display position on the transmission-type display device 14, which is decided by the display-position deciding unit 22.

In this case, the display controller 26 causes, for example, the transmission-type display device 14 to display, as the AR information, three-dimensional CG information d11 on the building whose angle is adjusted on the basis of the user position and the AR associated position p so that the user u would see the building therefrom if the building were built.

Figure 4B:
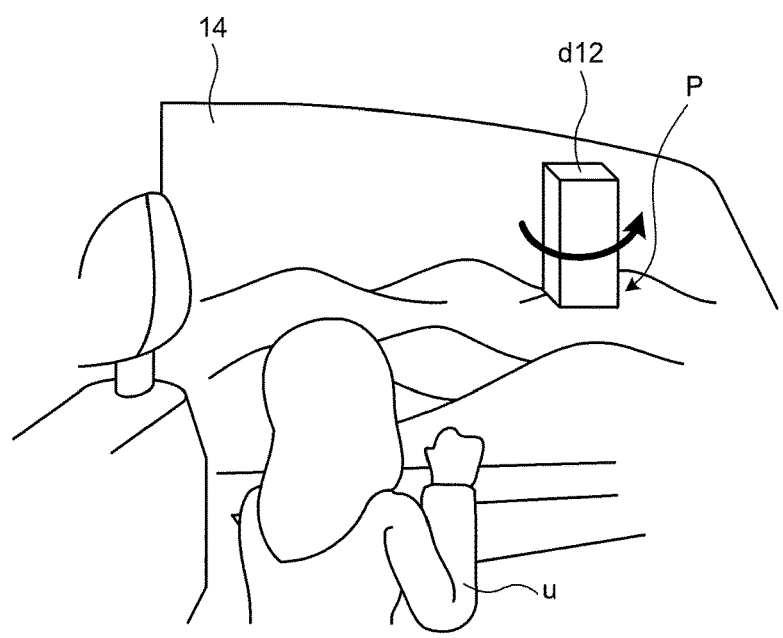

Subsequently, when the vehicle runs, as illustrated in FIG. 4B, the AR associated position p relatively moves to an obliquely-back side of the own vehicle. Therefore, the display controller 26 causes, for example, the transmission-type display device 14 to display three-dimensional CG information d12 on the building whose angle is rotated so that the user u would see the building therefrom if the building were built.

Thus, the display controller 26 causes, for example, the transmission-type display device 14 to display, in accordance with the positional relationship between the AR associated positions p and the user position, the different mode AR information such as the three-dimensional CG information d11 and the three-dimensional CG information d12 obtained by rotating the three-dimensional CG information d11.

Moreover, when the AR associated position p is gradually approaching the user position, the display controller 26 gradually increases the size of the displayed AR information and when the AR associated position p is gradually receding from the user position, the display controller 26 gradually decreases the size of the displayed AR information.

Thus, the AR information displaying device 1 causes, for example, the transmission-type display device 14 to display, as the AR information, the pieces of three-dimensional CG information d11 and d12 of the mode as if, for example, the building existed at the real AR associated position p seen through the display screen, and thus a sense of immersion of the user for the AR information can be improved.

Figure 5A:
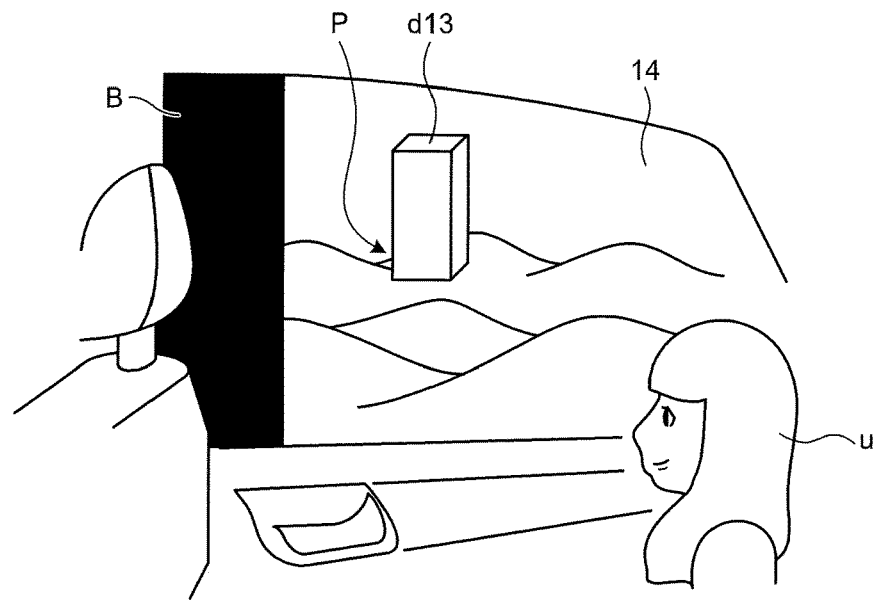
Figure 5B:
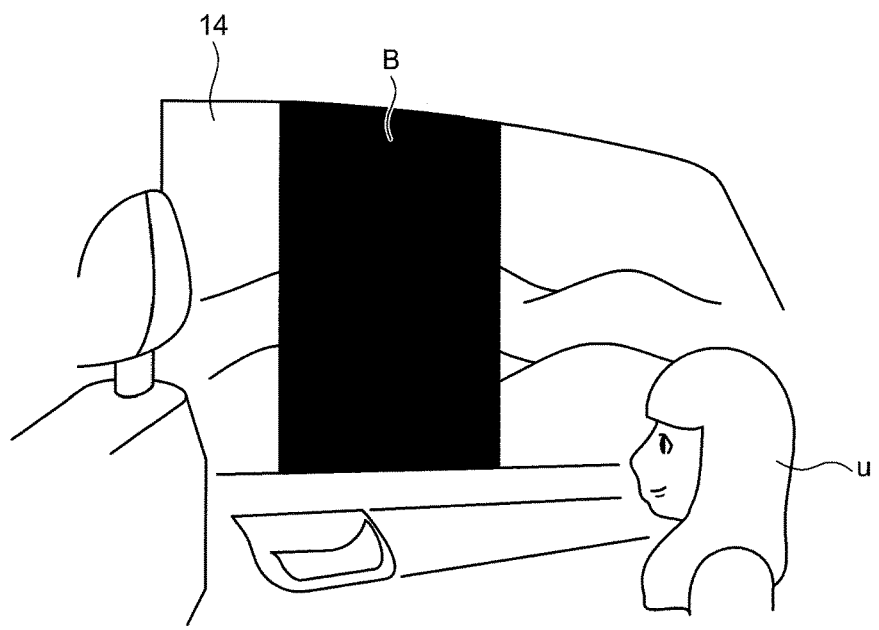

Next, as illustrated in FIG. 5A, for example, when three-dimensional CG information d13 on the building to be built is displayed at the AR associated position p, a blocking object B, which blocks visual recognition of the AR associated position p, appears on the display screen of the transmission-type display devices 14 with the running of the own vehicle in some cases. In this case, as illustrated in FIG. 5B, when the visual recognition of the AR associated position p is blocked by the blocking object B, the display controller 26 controls not to display the three-dimensional CG information d13.

For example, when it becomes in such a situation that the visual recognition of the building to be built is blocked by the blocking object B if the building to be built were built, the display controller 26 controls not to display the three-dimensional CG information d13 on the building to be built. In other words, the display controller 26 associates the switching between display and non-display of the AR information with appearance and disappearance of the AR associated position p caused by a real blocking object.

Thus, the AR information displaying device 1 can give the user u an impression as if the building to be built existed at the real AR associated position p seen through the display screen, and thus a sense of immersion of the user for the AR information can be improved.

The display controller 26 switches between display and non-display of the AR information on the AR associated position p in accordance with a duration time during which visual recognition of the AR associated position p is blocked by the blocking object B. For example, when the duration time during which visual recognition of the AR associated position p is blocked by the blocking object B is equal to or less than a threshold, the display controller 26 continues displaying the AR information without the non-displaying of the AR information.

Thus, for example, when the visual recognition of the AR associated position p is blocked for a very short time that is equal to or less than a threshold by the blocking object B repeatedly in a short time, the AR information displaying device 1 can prevent the browsing of the AR information from being blocked.

The AR information displaying device 1 may employ the configuration that changes the threshold to be compared with the duration time, during which the visual recognition of the AR associated position p is blocked by the blocking object B, in accordance with the AR information to be displayed. In a case of this configuration, the AR information displaying device 1 may store, in the storage 3, a plurality of thresholds whose values differ from each other. The AR information displaying device 1 stores each piece of the AR information included in the AR information DB 32 and the importance of the corresponding piece of the information in association with each other.

The display controller 26 compares the threshold, which is higher as the importance of the displayed AR information is higher, with the continuous blocked time of the AR associated position p caused by the blocking object B, and, when the continuous blocked time is equal to or less than the threshold, causes, for example, the transmission-type display device 14 to continue displaying the AR information without the non-displaying thereof.

On the other hand, the display controller 26 compares the threshold, which is lower as the importance of the displayed AR information is lower, with the continuous blocked time of the AR associated position p caused by the blocking object B, and, when the continuous blocked time is equal to or less than the threshold, causes, for example, the transmission-type display device 14 to continue displaying the AR information without the non-displaying thereof. Thus, the AR information displaying device 1 can reduce the frequency of the case where the important AR information is not displayed.

Figure 6A:
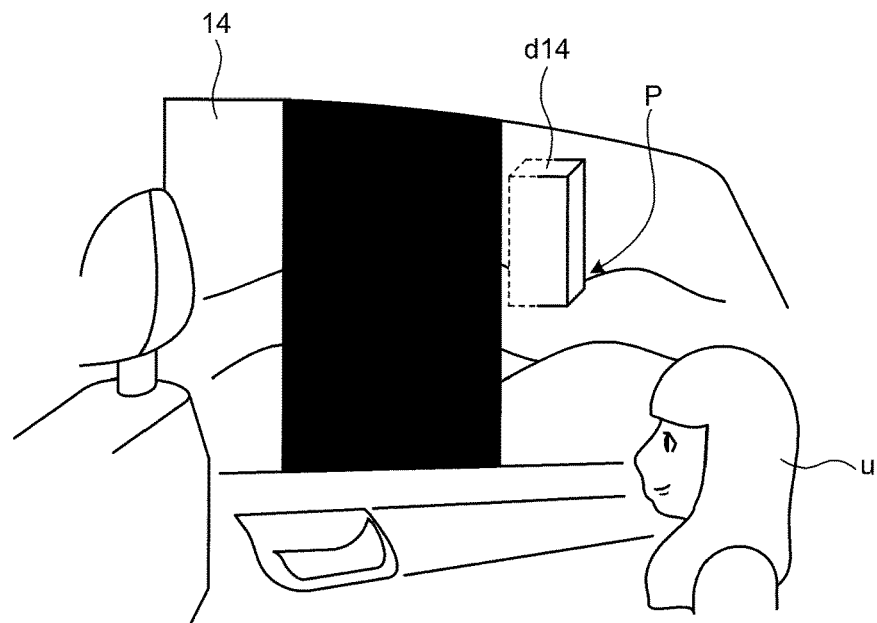

As illustrated in FIG. 6A, when the blocking of visual recognition of the AR associated position p caused by the blocking object B is started, the display controller 26 gradually reduces the thickness of the image of three-dimensional CG information d14 from a side where the blocking of the visual recognition is started by the blocking object B.

Figure 6B:
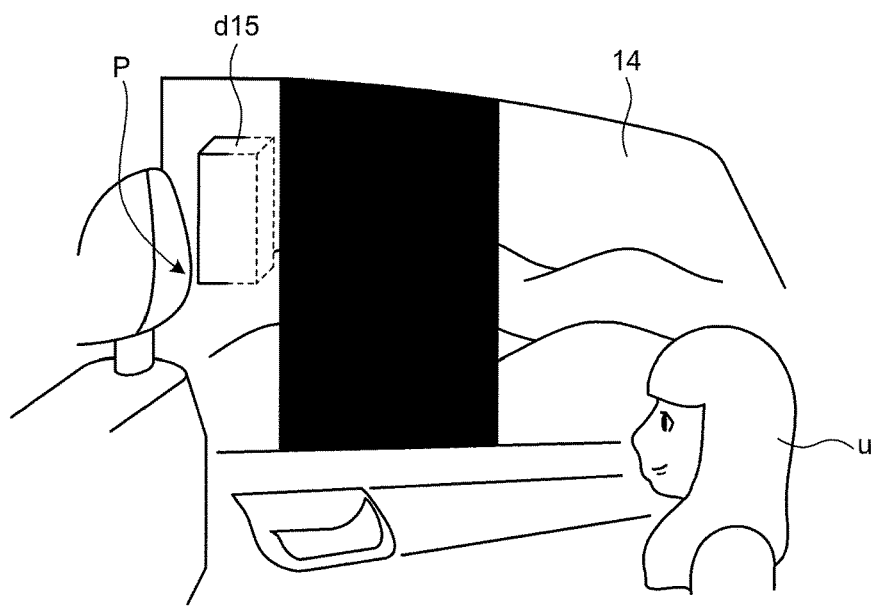

On the other hand, as illustrated in FIG. 6B, when the blocking of visual recognition of the AR associated position p caused by the blocking object B is terminated, the display controller 26 gradually increases the thickness of the image of three-dimensional CG information d15 from a side where the blocking of the visual recognition is terminated by the blocking object B. Thus, the AR information displaying device 1 can reproduce, by using an illusion of eyes of the user u, appearance and disappearance of the three-dimensional CG information d14 and d15 while giving less uncomfortable feeling to the user u.

Figure 7:
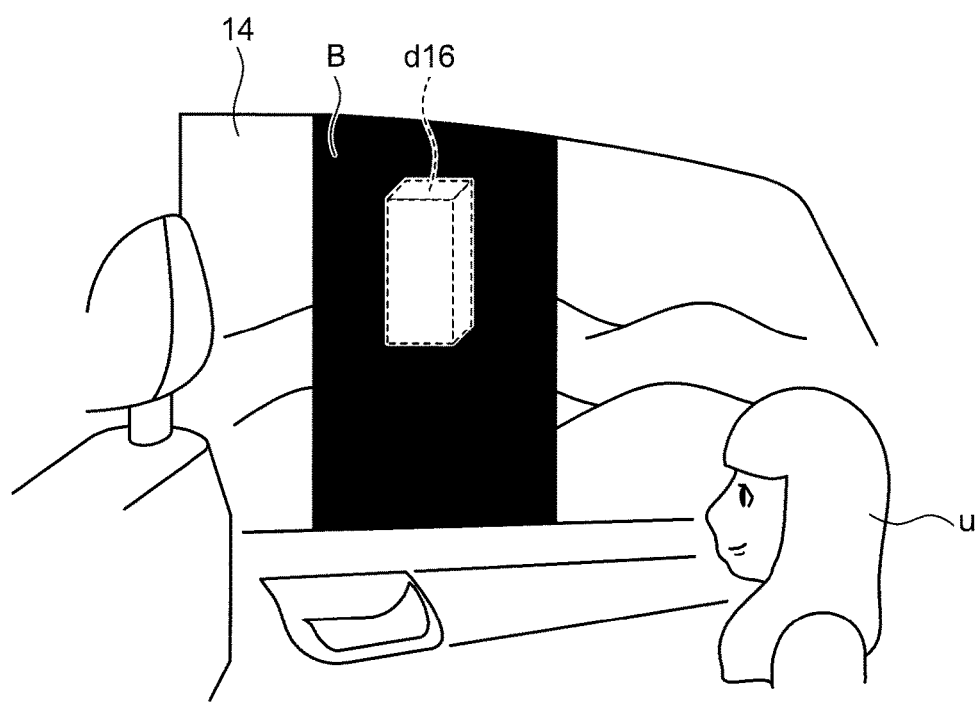

As illustrated in FIG. 7, when visual recognition of the AR associated position p is blocked by the blocking object B, the display controller 26 may also cause, for example, the transmission-type display device 14 to display three-dimensional CG information d16, which is a transmitted image of the AR information, without the non-displaying of the AR information.

Thus, the AR information displaying device 1 can cause the user u to continuously recognize contents of the AR information, moreover, the uncomfortable feeling given to the user u can be more reduced compared with the case where the AR information similar to that before the blocking by the blocking object B is continuously displayed during the blocking.

Moreover, in FIGS. 4A to 7, the cases where the AR information includes three-dimensional CG information are exemplified, however, the display controller 26 may cause, for example, the transmission-type display device 14 to display, in the situations illustrated in FIGS. 4A to 7, text information as the AR information, and to display a three-dimensional CG image and text information. In this case, the display controller 26 executes the display control of the text information in the display modes similar to those explained with reference to FIGS. 4A to 7.

Figure 8A:
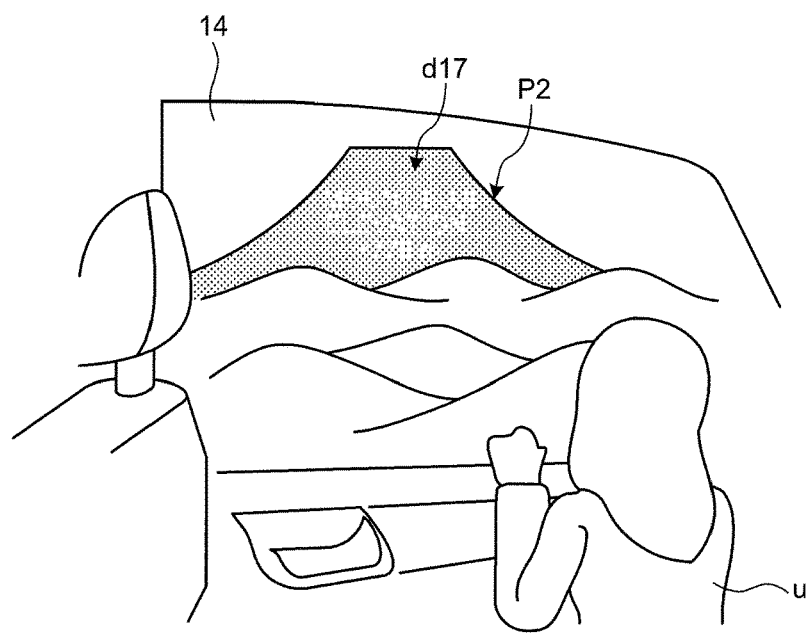

As illustrated in FIG. 8A, when causing, for example, the transmission-type display device 14 to display text information d17 of the AR information on AR associated position p2, the visibility of the text information d17 reduces in some cases caused by the brightness of the AR associated position p2 and the hue of the scene seen through the display screen of the transmission-type display device 14.

Figure 8B:
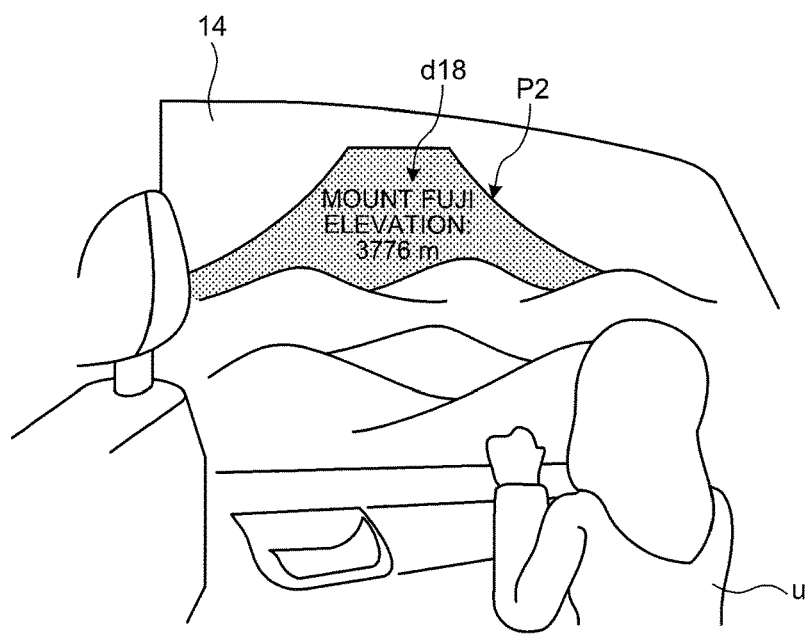

In this case, as illustrated in FIG. 8B, the display controller 26 adjusts the brightness in accordance with the brightness of the AR associated position p2, and causes, for example, the transmission-type display device 14 to display text information d18 whose color is adjusted in accordance with the hue of the scene seen through the display screen of the transmission-type display device 14.

In FIGS. 8A and 8B, the cases where the AR information is text information are exemplified, however, the display controller 26 may also cause, for example, the transmission-type display device 14 to display, in the situations indicated in FIGS. 8A and 8B, three-dimensional CG information as the AR information, and to display a three-dimensional CG image and text information. In this case, the display controller 26 executes the display control of the three-dimensional CG information in the display mode similar to that explained with reference to FIGS. 8A and 8B.

Thus, the AR information displaying device 1 can cause, for example, the transmission-type display device 14 to display the AR information whose viewability is constantly equal regardless of the brightness of the peripheral actual environment. The AR information displaying device 1 can suppress the assimilation of, for example, the AR information into the background colors, the reduction of visibility caused by complementary colors, and the generation of eyestrain, and can remove less-visible colors from the AR information to be displayed.

Moreover, the AR information displaying device 1 can suppress the generation of a situation where, for example, the AR information looks a color that is different from the original color of the AR information caused by the color mixture. The AR information displaying device 1 may preliminary set the color of the AR information to that of the color combination in consideration of the color mixture to be able to remove less-visible colors from the AR information. When the AR information becomes less visible caused by the color mixture, the AR information displaying device 1 may cause, for example, the transmission-type display device 14 to display the AR information whose color is different from the original color of the AR information.

Next, processes to be executed by the controller 2 according to the embodiment will be explained with reference to FIGS. 9 and 10. FIGS. 9 and 10 are flowcharts illustrating processes executed by the controller 2 according to the embodiment. When the AR information displaying device 1 is turned on, the controller 2 repeatedly executes the process illustrated in FIG. 9.

Specifically, as illustrated in FIG. 9, the controller 2 acquires first the vehicle position from the car navigation device 10 (Step S101), and further acquires vehicle interior images from the interior capturing units 11 (Step S102). Moreover, the controller 2 acquires vehicle exterior images from the exterior capturing units 12 (Step S103), and further acquires the running speed from the vehicle-speed sensor 13 (Step S104).

Subsequently, the controller 2 specifies the user position, the screen position, and the AR associated position on the basis of the vehicle position, the vehicle interior images, and the vehicle exterior images (Step S105). Subsequently, the controller 2 decides the display position of the AR information on the display screen on the basis of the user position, the screen position, and the AR associated position (Step S106).

Subsequently, the controller 2 decides the mode of the AR information according to the positional relationship between the user position and the AR associated position (Step S107), and adjusts the color and the hue of the AR information to be displayed (Step S108). Subsequently, the controller 2 determines whether or not there exists a blocking object (Step S109).

When determining that there exists no blocking object (Step S109: No), the controller 2 causes, for example, the transmission-type display device 14 to display the AR information on the specified AR associated position at the decided display position by using the decided mode, the color, and the hue (Step S111). On the other hand, when determining that there exists a blocking object (Step S109: Yes), the controller 2 executes an AR information non-displaying process illustrated FIG. 10 (Step S110), and terminates the process.

When starting the AR information non-displaying process, the controller 2 determines, as illustrated in FIG. 10, whether or not there exists a visible-recognition blocked part of the AR associated position caused by the blocking object (Step S201). When determining that there exists the visible-recognition blocked part of the AR associated position caused by the blocking object (Step S201: Yes), the controller 2 controls not to display a part of the AR information corresponding to the visible-recognition blocked part (Step S202).

Subsequently, the controller 2 determines whether or not there exists a visible-recognition unblocked part of the AR associated position with respect to the blocking object (Step S203). When determining that there exists a visible-recognition unblocked part (Step S203: Yes), the controller 2 gradually reduces the thickness of the AR information from a side where blocking of the visual recognition is started (Step S204), and shifts the process to Step S205.

On the other hand, when determining that there exists no visible-recognition unblocked part (Step S203: No), the controller 2 shifts the process to Step S205. In Step S205, the controller 2 determines whether or not there exists a visible-recognition block terminated part of the AR associated position with respect to the blocking object.

When determining that there exists a visible-recognition block terminated part (Step S205: Yes), the controller 2 gradually increases the thickness of the AR information from a side where blocking of the visual recognition is terminated (Step S206), and terminates the process. On the other hand, when determining that there exists no visible-recognition block terminated part (Step S205: No), the controller 2 terminates the process.

In Step S201, when determining that there exists no visible-recognition blocked part of the AR associated position caused by the blocking object (Step S201: No), the controller 2 determines whether or not the distance in the display screen between the blocking object and the AR associated position is equal to or less than a threshold (Step S207).

When determining that the distance on the display screen between the blocking object and the AR associated position is equal to or less than the threshold (Step S207: Yes), the controller 2 executes the process of Steps S204 to S206.

On the other hand, when determining that the distance on the display screen between the blocking object and the AR associated position is not equal to or less than the threshold (Step S207: No), the controller 2 causes, for example, the transmission-type display device 14 to display the AR information on the specified AR associated position at the decided display position by using the decided mode, the color, and the hue (Step S208), and terminates the process.

As described above, an AR information displaying device according to the embodiment includes a storage, a display-position deciding unit, and a display controller. The storage stores AR information on real positions. The display-position deciding unit decides a display position of AR information on a display screen on the basis of a user position, a screen position, and an AR associated position.

The display controller controls to display, at the display position decided by the display-position deciding unit, the AR information corresponding to a mode according to positional relationship between the AR associated position and the user position. Thus, the AR information displaying device controls to display the AR information of the mode as if, for example, the AR information existed at a real AR associated position seen through the display screen, and thus a sense of immersion of the user for the AR information can be improved.

The AR information according to the embodiment includes three-dimensional image information relevant to the associated real position. The display controller changes at least one of a direction and a size of the three-dimensional image information displayed on the display screen on the basis of the user position, the screen position, and the AR associated position. Thus, the AR information displaying device controls to display three-dimensional image information on the real AR associated position seen through the display screen, so that it is possible to improve a sense of immersion of the user for the AR information.

The AR information displaying device according to the embodiment further includes a blocking-object detector that detects a blocking object blocking visually recognition from the AR information displaying position of the AR associated position, and the display controller controls not to display the AR information when the visual recognition of the AR associated position is blocked by the blocking object.

Thus, the AR information displaying device associates switching of display and non-display of the AR information with appearance and disappearance of the AR associated position caused by the real blocking object, so that it is possible to give the user an impression as if the AR information existed at the AR associated position.

The display controller controls to display a transmitted image of the AR information when the visual recognition of the AR associated position is blocked by the blocking object. Thus, the AR information displaying device can cause the user to recognize contents of the AR information. Moreover, the AR information displaying device can reduce the uncomfortable feeling to be given to the user compared with a case where the AR information similar to that before the blocking by the blocking object is continuously displayed during the blocking.

The AR information displaying device further includes a speed acquiring unit that acquires a moving speed of the display screen and a time computing unit that computes a duration time during which the visual recognition of the AR associated position is blocked by the blocking object on the basis of the moving speed acquired by the speed acquiring unit.

The display controller switches between display and non-display of the AR information in accordance with the duration time computed by the time computing unit. Thus, the AR information displaying device can prevent browsing of the AR information from being blocked, for example, when the visual recognition of the AR associated position is blocked for a very short time by the blocking object repeatedly in a short time.

In accordance with a movement of the display screen, the display controller reduces a thickness of an image of the AR information from a side where the blocking of the visual recognition caused by the blocking object is started, and gradually increases the thickness of the image from a side where the blocking of the visual recognition is terminated.

Thus, the AR information displaying device can reproduce, by using an illusion of eyes of the user, appearance and disappearance of the AR information with less uncomfortable feeling.

The display controller adjusts a brightness of the AR information to be displayed in accordance with a brightness of the AR associated position. Thus, the AR information displaying device can control to display the AR information whose viewability is constantly equal regardless of the brightness of the peripheral actual environment. The AR information displaying device can suppress the assimilation of, for example, the AR information into the background colors, the reduction of visibility caused by complementary colors, and the generation of eyestrain, and can remove less-visible colors from the AR information to be displayed.

The display controller adjusts a color of the AR information to be displayed in accordance with a hue of the scene seen through the display screen. Thus, the AR information displaying device can prevent a situation where the AR information looks a color that is different from the original color of the AR information caused by the color mixture from being generated. The AR information displaying device preliminary sets the color of the AR information to be in the color combination in consideration of the color mixture to be able to remove less-visible colors from the AR information. The AR information displaying device may controls to display the AR information whose color is different from the original color of the AR information when the AR information becomes less visible caused by the color mixture.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An augmented reality information displaying device comprising:
   a storage that stores augmented reality information associated with a real position, the augmented reality information including three-dimensional image information; and
   a processor operatively coupled to the storage, the processor being programmed to:
      specify a real position of a user that is in a moving body and visually recognizes a display screen of a transmission-type display device of the moving body;
      specify a real position of the display screen:
      specify a real position in a scene seen through the display screen associated with the augmented reality information;
      decide a display position of the augmented reality information on the display screen based on the real position of the user, the real position of the display screen, and the real position of the augmented reality information;
      in response to deciding the display position of the augmented reality information, display, at the display position on the display screen, the augmented reality information;
      determine a moving direction of the moving body based on a positional relationship between the real position of the user and the real position of the augmented reality information; and
      in response to determining the moving direction of the moving body, change at least one of a direction and a size of the three-dimensional augmented reality information displayed on the display screen in accordance with the moving direction of the moving body.

2. The augmented reality information displaying device according to claim 1, wherein, in accordance with a movement of the display screen, the processor is further programmed to gradually reduce a thickness of an image of the augmented reality information from a side where the blocking of the visual recognition caused by the blocking object is started, and gradually increase the thickness of the image of the augmented reality information from a side where the blocking of the visual recognition caused by the blocking object is terminated.

3. The augmented reality information displaying device according to claim 1, wherein the processor is further programmed to adjust a brightness of the augmented reality information to be displayed in accordance with a brightness of the real position in the scene associated with the augmented reality information.

4. The augmented reality information displaying device according to claim 1, wherein the processor is further programmed to adjust a color of the augmented reality information to be displayed in accordance with a hue of the scene.

5. The augmented reality information displaying device according to claim 1, wherein, in response to determining that the moving body moves from side to side with respect to the real position of the augmented reality information, the processor is further programmed to change a direction and a size of the three-dimensional augmented reality information displayed on the display screen.

6. The augmented reality information displaying device according to claim 5, wherein, in response to determining that the moving body moves back and forth with respect to the real position of the augmented reality information, the processor is further programmed to change only the size of the three-dimensional augmented reality information displayed on the display screen.

7. An augmented reality information displaying device comprising:
    a storage that stores augmented reality information associated with a real position; and
    a processor operatively coupled to the storage, the processor being programmed to:
        decide a display position of the augmented reality information on a display screen of a transmission-type display device based on a real position of a user that visually recognizes the display screen, a real position of the display screen, and the real position in a scene seen through the display screen associated with the augmented reality information;
        display, at the display position, the augmented reality information corresponding to a mode according to a positional relationship between the real position of the user and the real position in the scene associated with the augmented reality information;
        detect a blocking object blocking visual recognition, from the display position, of the real position in the scene associated with the augmented reality information;
        cause the display screen not to display the augmented reality information when the visual recognition is blocked by the blocking object;
        acquire a moving speed of the display screen;
        compute a duration time during which the visual recognition is blocked by the blocking object based on the acquired moving speed; and
        switch between display and non-display of the augmented reality information in accordance with the computed duration time.

8. The augmented reality information displaying device according to claim 7, wherein
    the processor is further programmed to display a transmitted image of the augmented reality information when the visual recognition is blocked by the blocking object.

9. An augmented reality information displaying method that causes a computer to execute a process comprising:
    storing augmented reality information associated with a real position, the augmented reality information including three-dimensional image information; and
    specifying a real position of a user that is in a moving body and visually recognizes a display screen of a transmission-type display device of the moving body;
    specifying a real position of the display screen:
    specifying a real position in a scene seen through the display screen associated with the augmented reality information;
    deciding a display position of the augmented reality information on the display screen based on the real position of the user, the real position of the augmented reality information;
    in response to deciding the display position of the augmented reality information, displaying, at the display position on the display screen, the augmented reality information;
    determining a moving direction of the moving body based on a positional relationship between the real position of the user and the real position of the augmented reality information; and
    in response to determining the moving direction of the moving body, change at least one of a direction and a size of the three-dimensional augmented reality information displayed on the display screen in accordance with the moving direction of the moving body.

* * * * *